United States Patent [19]

Hyer

[11] Patent Number: 4,821,782
[45] Date of Patent: Apr. 18, 1989

[54] POWDER FEEDER
[75] Inventor: Frank S. Hyer, Duxbury, Mass.
[73] Assignee: Hyer Industries, Inc., Pembroke, Mass.
[21] Appl. No.: 8,611
[22] Filed: Jan. 29, 1987
[51] Int. Cl.$^4$ .............................................. H65B 1/34
[52] U.S. Cl. ........................................ 141/83; 222/56; 198/533; 141/72; 141/256; 141/255
[58] Field of Search ........................... 141/12, 71–81, 141/83, 255, 256; 222/199, 56; 198/533, 550.1, 550.5

[56] References Cited

U.S. PATENT DOCUMENTS

| | | | |
|---|---|---|---|
| 3,430,753 | 3/1969 | Strang | 198/533 |
| 4,131,193 | 12/1978 | Musschoot | 198/533 |
| 4,162,148 | 7/1979 | Furstenberg | 141/73 X |
| 4,481,985 | 11/1984 | Bruder et al. | 141/83 X |
| 4,688,610 | 8/1987 | Campbell | 141/83 |

FOREIGN PATENT DOCUMENTS 1549790  8/1979  United Kingdom ................. 141/83

Primary Examiner—Ernest G. Cusick
Attorney, Agent, or Firm—Jeremiah Lynch

[57] ABSTRACT

A hopper-feeder system for feeding stored powders at a uniform, controllable and predetermined rate. A spiral convoluted stirring agitator in close proximity and conforming to the hopper wall is rotated in a direction tending to lift and dilate the powder, counteracting its tendency to bridge and to undergo intermittent or non-uniform changes in density and rate of discharge. The head load upon the feeder as well as the material damping effect on the feeder are controlled by a column cutter on the agitator that undercuts the column of powder extending through the hopper opening.

9 Claims, 1 Drawing Sheet

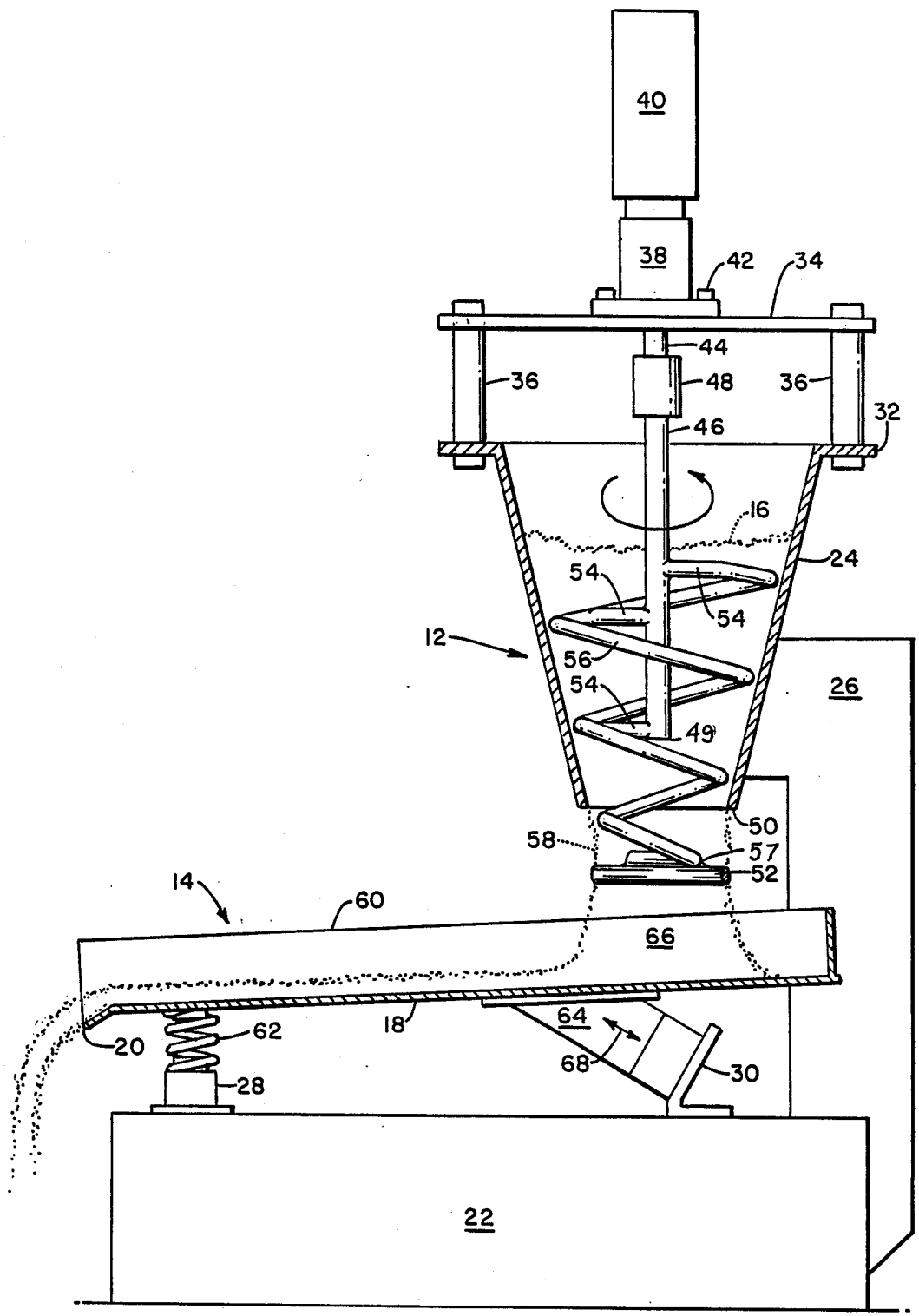

POWDER FEEDER

SUMMARY OF THE INVENTION

This invention relates generally to apparatus for continuously feeding bulk particulate material at controlled, adjustable volumetric or weight rates, typically into a conveying system for subsequent processing, packaging or storage. More particularly, the invention relates to a feeder having improved capability for handling resin or other powders and particulate materials that tend to become compact, to be cohesive and to have high mechanical damping characteristics.

Prior art feeders have been limited in their ability to feed such powders at a uniform, controlled rate particularly at the lower end of the operating rate range. A common arrangement comprises a screw or auger type feeder supplied by means of a supply or storage hopper equipped with some form of agitator. In general, screw or auger type feeders create interrupted flow streams at the low end of their operating range by reason of the very low rotational speed of the screw. This causes a series of flow surges as the individual flights discharge the powder at the exiting point of the surrounding tube or trough of the feeder. Other interruptions and nonuniformities in the powder flow streams result from the nonuniform delivery of the powder from the hopper. With powders of the particular types referred to above, this frequently results from temporarily stable bridging in the hopper above the outlet followed by intermittent collapse of the bridges.

Prior art efforts to eliminate the foregoing disadvantages have included the use of vibratory pan feeders. In these feeders a pan located for receiving the powder from the hopper is caused to reciprocate in successive rapid strokes, the strokes having directional components both parallel and normal to the pan surface so that the powder progresses along the surface in a rapid succession of short movements. Vibratory pan feeders are well known and may be driven by electromagnetic or electromechanical action under mechanically tuned conditions with respect to the frequency of vibration. Feeders of this type have demonstrated an ability to feed powders over wide rate ranges without exhibiting any characteristic flow surges, provided that certain operating conditions are maintained. First, the material head load on the pan, specifically the head load under the hopper discharge opening, must be uniform and preferably of a minimum magnitude consistent with the rate of feed. Second, the mechanical damping of the pan vibrations produced by the material beneath the hopper discharge opening must also be uniform and of minimal magnitude.

The use of vibratory pan feeders with supply hoppers of conventional configuration have not completely solved the problems mentioned above which are associated with powders that are cohesive, that tend to compress and become compact and that have high mechanical damping characteristics. The difficulties have arisen from the inability of such supply hoppers to satisfy the conditions of optimum operation of the vibratory pan feeders, and result in nonuniform discharge due to bridging and problems associated with the resulting head load influences and mechanical damping effects of the material resting on the feeder.

With a view to overcoming the foregoing difficulties, the features of this invention include a powder feeder system incorporating a hopper, an agitator within the hopper, drive means for the agitator and transport means adapted to receive the material discharged from the hopper and to convey it at a predetermined rate. The agitator is of spiral or twisted shape, comprising convoluted tapered helical turns that are in close proximity and conforming to the hopper wall. The agitator is rotated by drive means in a direction tending to lift the powder and to dilate it, thereby opposing its tendency to become compact and to form bridges over the hopper outlet.

The hopper structure may be operatively combined with a vibratory pan feeder in a coordinated system adapted for enabling the pan feeder to operate under optimum conditions for attaining a constant controlled rate of material flow, particularly at the low end of the operating range where prior art feeders have been found unsatisfactory. The features of the hopper-feeder system are particularly adapted to maintain a uniform head load of material on the pan at the hopper outlet, the material being as free of compactness and high or nonuniform mechanical damping characteristics as is possible in view of its inherent cohesiveness.

Other features of the invention reside in structures and arrangements of the components of the system that will be evident from the following description of a preferred embodiment.

BRIEF DESCRIPTION OF THE DRAWINGS

The drawing is a side elevation partially in section illustrating the presently preferred embodiment of the invention.

DETAILED DESCRIPTION OF THE PREFERRED EMBODIMENT

Referring to the drawing, the powder feeder of this invention comprises a hopper 12 and a vibratory pan feeder 14, the hopper being adapted for storing particulate resins or other powders 16 and for discharging them at a uniform rate, and the transport means being adapted to receive the discharged powder, to feed it along the surface of a pan 18 and to discharge it at a uniform, variable, controlled volume or weight rate at a discharge end 20. The material may fall from the end 20 onto a conveyor or into any desired receiving apparatus for such purposes as processing, packaging or storage.

In this embodiment the hopper and feeder are both supported upon a scale 22, the hopper having a frustoconical wall 24 secured to a stand 26 supported on the scale, and the transport means being supported by brackets 28 and 30 on the scale.

In a particular embodiment tested the hopper wall 24 has a slope of 75 degrees from the horizontal, and is provided at its upper end with an annular flange 32 supporting a frame 34 by means of a plurality of annularly spaced pedestals 36. A reduction gear 38 driven by a variable speed motor 40 is secured by bolts 42 to the frame 34, and has an output shaft 44 coaxial with the axis of the hopper wall 24. On the same axis there is provided an agitator shaft 46 fastened to the shaft 44 by a coupling 48. The shaft 46 extends downwardly to an end 49 above the hopper discharge opening 50.

Radially extending from the shaft 46 are a plurality of spokes 54 that are mutually displaced both angularly and longitudinally, all secured and extending at right angles to the shaft 46. These spokes support a convoluted spiral agitator member 56 formed in a generally helical, tapered shape so that the convolutions or turns spiral upwardly and radially outwardly and are in close, non-touching proximity to the inner surface of the hopper wall 24, conforming to its shape. The convolutions extend downwardly through the opening 50 to a column cutter or cross piece 52 welded on the lowest convolution at 57. The cross piece intersects and extends at right angles to the axis of the shaft 46.

As shown, the cross piece 52 is located a short distance below the discharge opening 50 of the hopper, and its lengthwise dimension preferably substantially equals the diameter of the column of material 58 falling from the discharge opening. In the illustrated embodiment the agitator member 56 is formed of wound stainless steel tubing of circular cross sections. This form has proven effective for the handling of a variety of powders including aluminum silicate powder having a liquid additive, tetrafluoroethylene powder and aluminum stearate powder as well as other powders.

The motor 40 and reduction gear 38 rotate the agitator shaft 46 at a low speed sufficient only to apply adequate lifting forces to the stored material to dilate and decompress it and effectively oppose its tendency to densify, to become compact and to gain sufficient strength to form a stable arch within the hopper. The speed may be, for example, $\frac{1}{4}$ to 10 revolutions per minute, and in frequent applications it is in the range of $\frac{1}{4}$ to 2 rpm.

The vibratory pan feeder 14 comprises the pan 18 having longitudinal side walls 60, a helical compression spring mount 62 extending from the bracket 28 to an attachment on the pan 18, and an electromagnetic drive 64 of conventional form. The pan may have a metal surface along which the powder material is transported toward the discharge end 20, or the surface may be coated with fabric or some other material selected to reduce the tendency of the powder to stick to the surface or to flow nonuniformly across the width of the pan surface. In accordance with conventional technology, the feeder comprises a tuned system having, on the one hand, the combined masses of the pan 60 and the head load of the powder material 66 in the pan, and on the other hand, the spring 62. These parameters determine the natural frequency of the feeder. At these relatively low speeds the agitator action is insufficient to cause aeration or fluidization of the material which would cause undesirable changes in its density. The excitation for driving the system has three primary parameters, namely, the drive angle represented by arrows 68 in the direction of which the force is applied to the pan for vibrating it, and the frequency and amplitude of the vibrations. For a particular feeder the drive angle is fixed by the design. The natural frequency, being a function of the head load, is subject to any variations therein. The frequency of the drive unit 64 is ordinarily chosen to be somewhat below the natural frequency.

The characteristics of pan feeder systems are commonly exhibited by a so-called "magnification factor" curve plotting the magnitude of the pan stroke as the ordinate against the ratio of the operating to natural frequencies as the abscissa. The plot is a bell curve peaking at a super-resonant ratio of one. The peak of the curve is higher for conditions in which the material 66 in the pan produces little damping of the vibrations, and lower for conditions producing greater damping. Thus it is possible to achieve longer stroke amplitudes of vibrations when the exciting frequency is at or near the natural frequency, but in the same region of the curve the incremental effects of changes in the material damping effect are also greater. For a working compromise, it has been found preferable to employ an exciting frequency that is slightly below the natural frequency, at which substantially amplified vibrations are obtained with somewhat diminished sensitivity to variations in the damping effect of the material 66.

In order to provide uniform, constant and preferably minimal damping effects, the convoluted agitator 56 is employed. By rotation of the agitator in a direction tending to elevate and dilate or decompress the material 16, internal material pressures are reduced, stable arches are prevented, sudden interruptions in the flow of the material from the hopper to the pan are eliminated and a uniform rate of material discharge to the feeder is made possible.

In operation, as viewed at the discharge end 20, the material flows in a steady manner analogous to a waterfall. The material 66 reaching the pan tends to form a column ascending into the hopper, the column tending to become more compact due to the inherent cohesive properties of the material. However, the cross piece 52, being rotated with the agitator 54, continually undercuts the formation of a stable column of material, whereby the damping effect of the material 66 on the vibration amplitude of the feeder is affected substantially only by that material which is beneath the cross piece. By a proper selection of dimensions with a view to the properties of the particular material 16, it is possible to minimize greatly the damping effects of the material and to cause them to remain substantially constant during operation of the feeder.

The rate of material discharge from the hopper to the feeder is automatically equalized to the feed rate of material in the feeder. Material is discharged from the hopper only as and when the body of material 66 on the pan beneath the hopper outlet opening is depleted by the movement of the material toward the discharge end 20. The column of material above the cross piece prevents material flow from the hopper at a rate greater than that at which a void below the cross piece tends to be created by the feeder action. Flow from the hopper ceases completely when the drive 64 is stopped for any reason. In this case it is preferred to continue the operation of the agitator motor 40 until the feeder drive is restarted, and thereby a further advantage of the invention is obtained. In the absence of the agitator action, when the feeder is stopped the powder material would begin to settle and become more compact, and characteristically this settling and compaction would continue progressively during the time period while the feeder is stopped, with the result that feeding would not resume immediately at the previous rate when the feeder is restarted. In certain cases the rate of feed would be uneven, or material would not flow in and from the feeder at all due to the compaction of the material in the hopper. However, if the agitator action is continued during feeder stoppage such compaction does not occur and uniform material discharge at the end 20 is quickly resumed when the feeder is restarted. This feature has obvious significant practical advantages in numerous applications where temporary shutdowns would otherwise cause disruption of downstream processing or packaging operations supplied by the feeder.

In one application of the powder feeding system described above, a closed loss-of-weight feeder control is employed. This control varies the magnitude of the voltage applied to the drive unit 64, the drive frequency being fixed as a function of the natural frequency as discussed above. The amplitude of the feeder vibrations, and therefore the rate of feed, is a function of the applied voltage. The scale 22 is responsive to the combined weight of the hopper 12 and feeder 14. Sensing means of a conventional form (not shown) measure the rate of change of the weight on the scale resulting from the discharge of the powder material at the discharge end 20. A set point for this rate is predetermined, and the voltage applied to the power unit 64 is varied to maintain the rate at the set point value.

The above-described powder feeding system may also be employed with an open loop control in which the voltage applied to the power unit 64 is simply varied to increase or decrease the volume or weight rate of material flow from the discharge opening 20 as desired.

It will be observed that certain variations in the structure of the powder feeder may be accomplished for particular applications without departing from the spirit or scope of this invention. For example, the convoluted helicoidal agitator member 54 may be formed from a solid rod or from a strip or ribbon of any desired cross section. The shape of the hopper wall 24 may not only have a different pitch, but may also be of other than a simple frustoconical form. Thus the hopper wall may be formed of wall portions of different slopes, the wall portions being either rectilinear or curvilinear as viewed in the elevation of the drawing, or a combination of both, but being circular in horizontal cross section. In any case the convoluted member 56 has a corresponding shape so that its turns are in close proximity to the inner hopper wall portions, at least over a substantial portion of their length.

Also, the portions of the agitator turns that are in close proximity to the hopper wall portions may comprise a plurality of spaced portions rather than a single continuous tapered helix as shown. In any case the diameter of the major portions of the hopper wall in the ascending direction increases so that the net effect is to elevate and dilate the material 16 for the reasons above described.

Various forms of column cutters may be employed in place of the simple bar shape of the cross piece 52. Also, other structural variations and operational modes of the vibratory pan feeder may be accomplished by one skilled in the art, as will be evident from the foregoing specification.

I claim:

1. Apparatus for continuously feeding cohesive powder at a controlled rate comprising, in combination,
    a hopper for storing the powder having a wall terminating at an outlet opening, said wall having a wall portion of circular horizontal cross section which decreases in diameter toward said opening,
    an elongate agitator having a dilating portion formed of convolutions spiraling upwardly from said opening and radially outwardly in close proximity and conforming to said wall portion over a substantial portion of its axial length, said opening being otherwise unobstructed,
    drive means for rotating the agitator as the powder is discharged from said opening, the direction of rotation tending to lift the powder in contact with said dilating portion, the speed of rotation being sufficient only to dilate and decompress the powder and to prevent the formation of stable arches thereof in the hopper, and
    a vibratory pan feeder having a pan adapted to receive the powder, said hopper and agitator being formed and driven to produce a column of powder ascending from the pan up to the agitator, said column forming a head load of constant mass beneath said opening, said feeder being adapted to convey the powder from said column at a predetermined rate, whereby the rate of powder discharge from the hopper to the feeder is limited to said predetermined rate and is sufficient only to replace the powder conveyed from said column.

2. A powder feeder according to claim 1 in which said dilating portion extends through and terminates at a lower end located below said opening.

3. A powder feeder according to claim 2, in which the agitator has a cutting portion located at the lower end of said dilating portion and adapted to cut through said column of powder.

4. A powder feeder according to claim 3, in which said cutting portion comprises a crosspiece extending transversely of the axis of the agitator.

5. A powder feeder according to claim 1, in which the agitator has a shaft supporting said dilating portion and extending coaxially with said wall portion, the lower end of said shaft being located above said opening.

6. A powder feeder according to claim 1, including
    a scale supporting the hopper, agitator and feeder and responsive to the loss of weight of powder from the feeder.

7. A powder feeder according to claim 6, including
    a closed loop control adapted to sense the rate of change of the weight on said scale and to vary the rate at which the feeder conveys the powder in response to said sensed rate.

8. A powder feeder according to claim 1, in which said wall portion is substantially of conical shape.

9. A powder feeder according to claim 1, in which the drive means is located above the hopper.

* * * * *